United States Patent [19]

Rehm et al.

[11] 4,324,734
[45] Apr. 13, 1982

[54] DE-EMULSIFIER

[75] Inventors: Stephen J. Rehm, Tulsa; Young R. Lee, Broken Arrow, both of Okla.

[73] Assignee: Combustion Engineering, Inc., Windsor, Conn.

[21] Appl. No.: 200,733

[22] Filed: Oct. 27, 1980

[51] Int. Cl.$^3$ ............................ C07F 9/02; C08H 3/00
[52] U.S. Cl. ................................ 260/403; 260/404.8; 260/407; 252/358
[58] Field of Search ................. 260/403, 404.8, 407, 260/410.6; 252/358

[56] References Cited

U.S. PATENT DOCUMENTS

| | | | |
|---|---|---|---|
| 2,950,299 | 8/1960 | Kirkpatrick | 260/407 |
| 3,057,891 | 10/1962 | DeGroote | 260/407 |
| 3,957,855 | 5/1976 | Miller | 260/404.8 |

*Primary Examiner*—John F. Niebling
*Attorney, Agent, or Firm*—Arthur L. Wade

[57] ABSTRACT

A polyester is formed from a polyol of high molecular weight and a polybasic acid with a reactive acid catalyst to have an effective viscosity and acid number.

12 Claims, 4 Drawing Figures

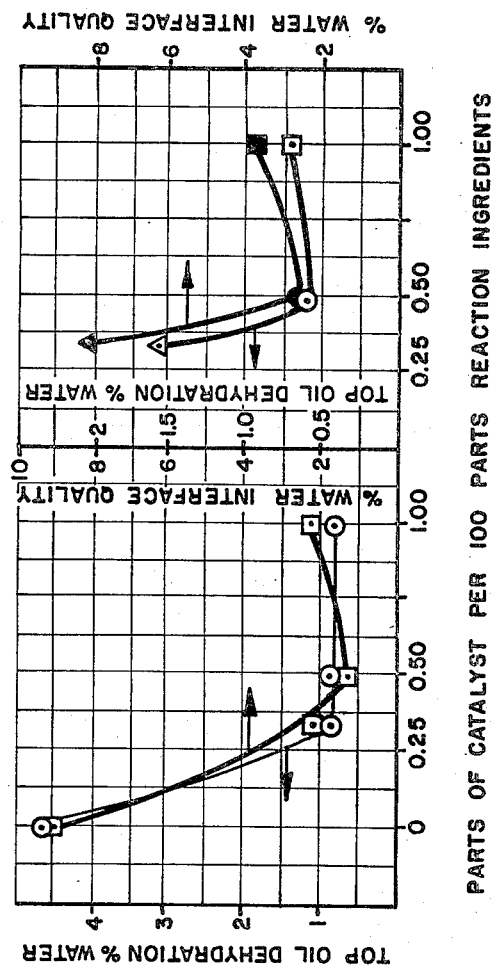

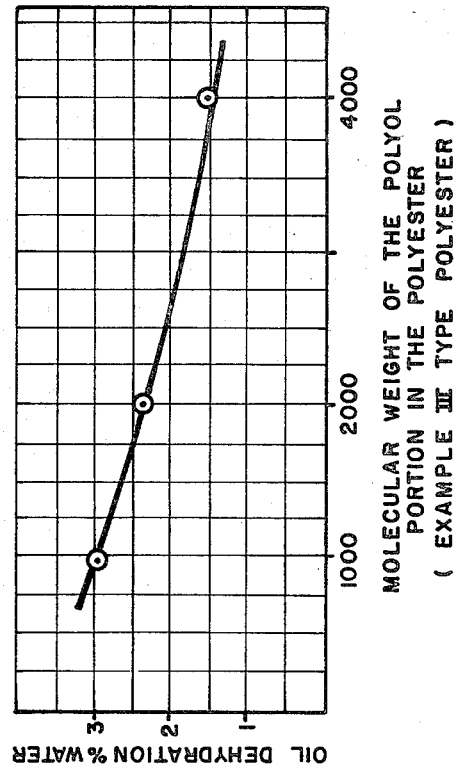

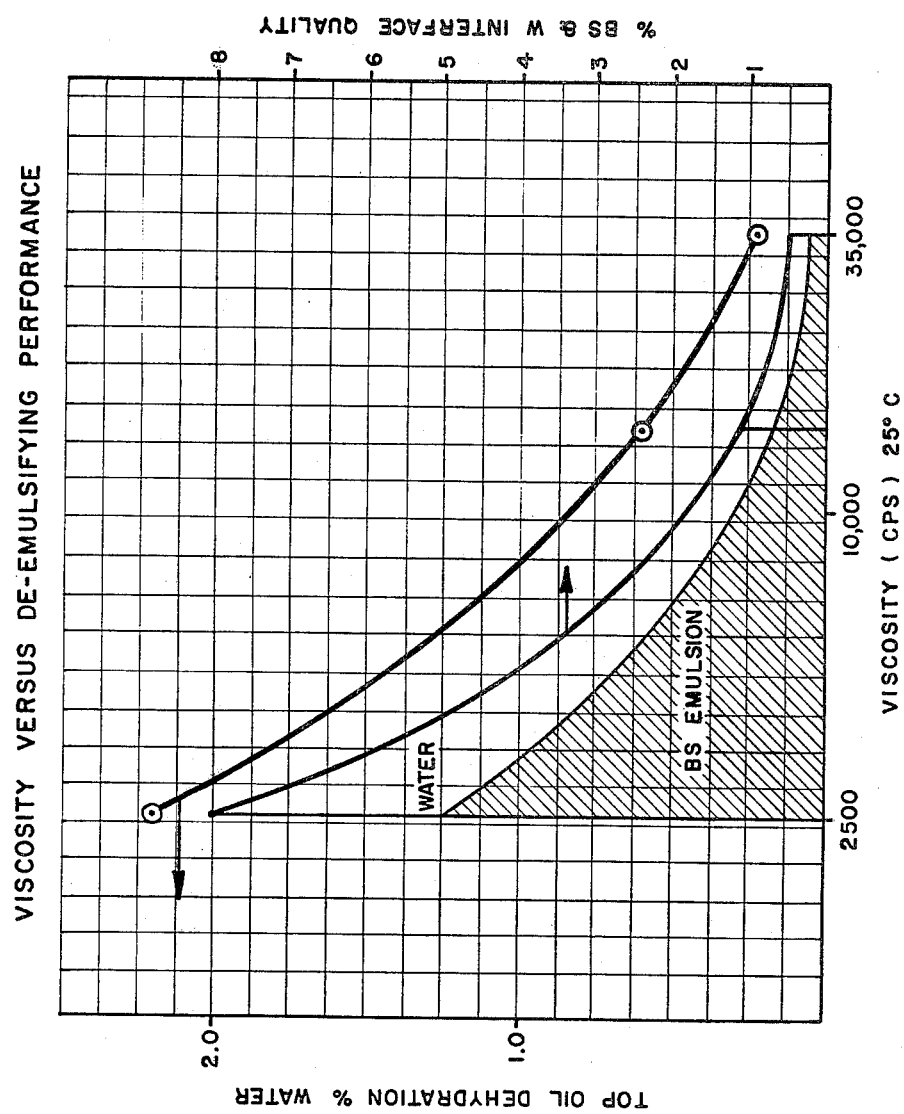

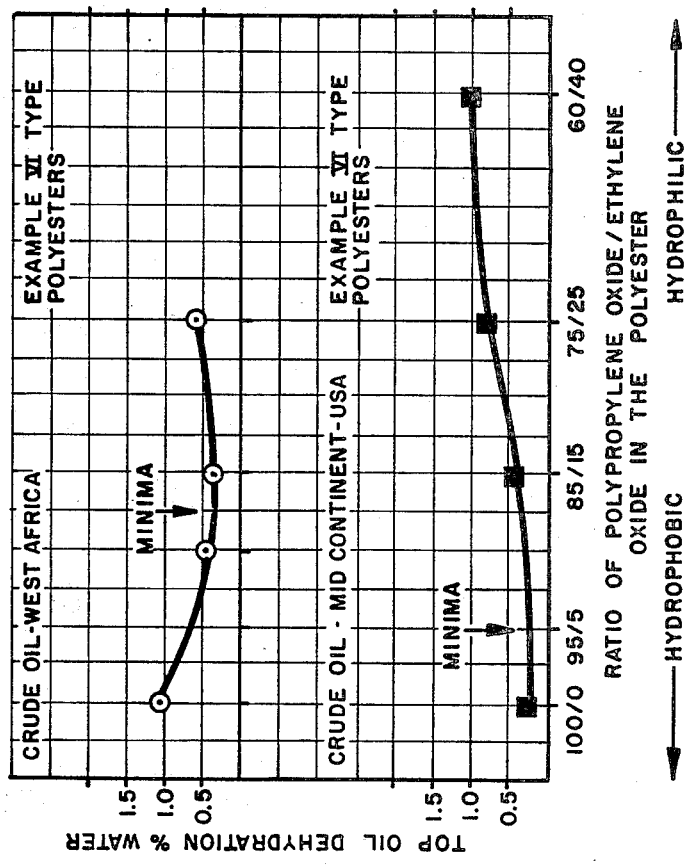

DE-EMULSIFIER

TECHNICAL FIELD

The present invention relates to the formation of a strongly lipophilic polyester in the presence of an acid catalyst. The invention further relates to the formation of a de-emulsifier exhibiting high viscosity and low acid number which is associated with its de-emulsifying capacity.

BACKGROUND ART

The chemical and physical mechanisms with which emulsions of oil and water are formed are well-known. The knowledge accumulated suggests that when water is broken into relatively small-size drops and dispersed through oil, the drops are surrounded with a film of a material which is strongly hydrophilic. This film of emulsifier effectively isolates the droplets of water from each other. When the isolating film is effective, the emulsion is classified as stable, the water droplets remaining dispersed through the oil. Therefore, to de-emulsify, a force is needed to penetrate, or weaken, the hydrophilic film of emulsifier which surrounds each water droplet so that the droplets of water can then be driven together in coalescense. A strongly lipophilic material is needed to exchange, neutralize, or disrupt the electrical charges within the hydrophilic film and thereby penetrate, or weaken, the film.

The mechanism by which a de-emulsifier weakens, or penetrates, the film of hydrophilic emulsifiers is controversial to some extent. There is investigation that suggests the exchange of electrical charge between the hydrophilic emulsifier film about the water droplets and de-emulsifying material. The precise nature of this interaction between emulsifying and de-emulsifying materials need not be developed at this time. It is sufficient to describe the emulsifying material as hydrophilic and the de-emulsifying material as lipophilic. A responsible statement is that some type of electrical exchange takes place to weaken, or penetrate, the hydrophilic film with resulting coalescence of the water droplets.

The days when empirical methods stumbled upon effective de-emulsifying compounds is long past. Backed by some accumulated knowledge of the mechanisms of emulsification and de-emulsification, compounds are now being systematically developed which apply obviously effective force to neutralize the various emulsifying agents which exist in water-in-oil emulsions.

One popular methodology of characterizing the de-emulsifying material is to categorize the de-emulsifying agent with respect to its relative solubility in water and in oil. Four such categories then depict the interactions which specify the nature of the de-emulsifying agent: lipophilic-hydrophobic (LIHO), lipophilic-hydrophilic (LIHI), lipophobic-hydrophobic (LOHO), and lipophobic-hydrophilic (LOHI). (Lipo- meaning oil, hydro- meaning water, -philic meaning loving, and -phobic meaning hating). The type of interaction (solubility) of the de-emulsifying material required to dehydrate oil effectively is highly dependent upon the nature and quantity of the stabilizing emulsifier. As each interaction suggests, the de-emulsifying material contains chemical functionability which renders the de-emulsifying agent interface active; the de-emulsifying agent is attracted to and may concentrate at the oil-water interface of an emulsion. For ease of application, it has been common practice to develop de-emulsifying materials which primarily exhibit LIHO or LIHI characteristics; oil loving—water hating, or oil loving—water loving characteristics.

There is another school of thought which emphasizes that the most important characteristic of the de-emulsifying material is its wetting characteristics, while another school teaches that the de-emulsifying agent must be interface active, but neither appreciably soluble in the oil or water. It must be remembered that the importance of the de-emulsifying material in resolving emulsions is not bound to theoretical considerations of its solubility, wetting, or interfacial activity, but bound to performance.

One popular, and well-known, de-emulsifier compound is the polyester. When a polyol is brought together with a polybasic acid under the proper reaction conditions in the presence of an appropriate catalyst, the —OH of the polyol will combine with the —COOH of the polybasic acid to form water and a polyester. The resulting polyester is a de-emulsifier. The present problem is how to strengthen this de-emulsifier.

DISCLOSURE OF THE INVENTION

The present invention contemplates the formation of a polyester from a polyol and a polybasic acid in the presence of a non-oxidative reactive acid catalyst which does not accelerate the elimination reaction of water from any secondary alcohols which may be present in the polyol. Further, the invention contemplates forming the polyester with a predetermined minimum viscosity. Further, the invention contemplates forming the polyester with a predetermined weight ratio of the non-oxidative reactive acid catalyst to the polyester.

Other objects, advantages and features of this invention will become apparent to one skilled in the art upon consideration of the written specification and appended claims.

BRIEF DESIGNATION OF THE DRAWINGS

FIG. 1 is a performance graph of the de-emulsifier in which the catalyst was varied, the de-emulsifier embodying the present invention;

FIG. 2 is a performance graph of the de-emulsifier as the molecular weight of the polyol portion in the polyester was varied.

FIG. 3 is a performance graph in which the viscosity of the de-emulsifier was varied;

FIG. 4 is a performance graph of the de-emulsifier of different oxide ratios tested on emulsions of two different crude oils.

BEST MODE FOR CARRYING OUT THE INVENTION

As previously stated, polyesters are a class of compounds well established as de-emulsifiers of water-in-oil emulsions. Polyesters are generally formed from the reaction of a mono- or polyhydric polyol (the term polyhydric polyol discussed in this text is herein referred to as polyol) and a mono- or dibasic acid. The molecular weights of these polyols normally range from 400 to 7,500. The polyols are usually made from block or mixed co-polymers of propylene oxide and/or ethylene oxide. The proportion of the propylene oxide to ethylene oxide in the polyol can be adjusted to provide the optimum treating characteristics of the polyester; the greater the proportion of propylene oxide in the polyol, the greater the lipophilic characteristics; the greater the proportion of ethylene oxide in the polyol, the greater the hydrophilic characteristics of the polyester. These polyols have usually intrinsic surface active properties which contribute to their efficiency as water-in-oil emulsion breakers.

As previously explained, these materials seek out the interface between oil and water of the dispersed water particles of the emulsion. The solubility of these de-emulsifiers in water and oil determine whether their major emulsion breaking action is one of coagulation, flocculation, or coalescence (or some combination). Generally speaking, the chemical ingredients of the de-emulsifier which exhibit lipophilic-hydrophilic characteristics tend to make the de-emulsifier rapidly coalescing. Whereas, the ingredients of the de-emulsifier which exhibit lipophilic-hydrophobic characteristics tend to make the de-emulsifier rapidly coagulating. To balance an emulsion breaker so that adverse treatment can be avoided, such as sludging or burning the emulsion, it is common practice to use both lipophilic-hydrophilic (LIHI) and lipophilic-hydrophobic (LIHO) ingredients in complex formulations to give the desired oil dehydration.

It is well-known in the art of emulsion breaker formation that the higher the molecular weight of the lipophilic portion in the polyol, the greater the tendency of that polyol to function. These descriptions also cover polyesters. From a mechanistic point-of-view, the oil-soluble lipophilic portion acts to resolve a water-in-oil emulsion from the oil side of the emulsion interface. There are several ways to increase the lipophilic characteristic. Since it is not practical, as of this date, to manufacture a lipophilic residue exceeding 6,000 molecular weight by reacting propylene oxide with a dihydric polyol by conventional means, it is necessary to build molecular weight or lipophilicity by some polymerization scheme. The simpler scheme is to bring about esterification of a polydiol with a diacid. Unfortunately, this type of product is not overly efficient in oil dehydration. The use of a polyol (tri- or poly-functional) with a dibasic acid was seen as improving the net efficiency. An alternate scheme of using a polyol (di- or polyfunctional) with a tribasic acid would also seem to produce an efficient lipophilic polyester. This product is disclosed in at least Kirkpatrick U.S. Pat. No. 2,987,490. However, the efficiency of that product, compared with commercially available triolesters, is not significant.

It was at this point that the present invention was concevied as the use of an appropriate reactive catalyst. A nonoxidative, reactive acid catalyst was selected to promote esterification. The desired reactive acid catalyst would not accelerate the elimination reaction of water from any secondary alcohol if present in the polyol. An acidic phosphorus derivative was discovered as the appropriate catalyst. The catalyst is conceived to be formed from the family of acidic phosphorus derivatives including phosphoric acid, polyphosphoric acid, phosphoric acid anhydride (phosphorus pentoxide $P_2O_5$), phosphorous acid, and any of the organo-phosphorus derivatives identified as phosphonic acids. It was determined that this family of acidic phosphorus derivatives contribute more than just catalytic behavior to the esterification reaction. These catalysts also are incorporated into the polymer network and, as such, are reactive catalysts. Evidence indicates that the reactive catalyst is incorporated into the polymer functionally as a phosphorus ester; however, the exact functionality and position of the phosphorus group in the polymer is unknown. When phosphoric acid was used as the reactive catalyst, it was determined that half of the reactive catalyst was incorporated into the polyester, most probably in the form of a phosphate ester, a polyphosphate ester, or a phosphate di- or tri-ester. The incorporation of phosphorus into the polymer network also builds molecular weight and imparts intrinsic surface active properties to the polymer.

For ease of application in batch reaction conditions, the reactive catalyst is preferably handled or transferred as a liquid, if possible, although solids may be used. The reactive acidic phosphorus derivative also performs an additional function of neutralizing any base catalyst required in the oxyalkylation step to secure high molecular weight polyol; when phosphoric acid was used, the resultant sodium or potassium salt did not complicate the esterification process.

Of the several high molecular weight polyesters prepared by this method, polypropylene glycol was selected because it accentuated the lipophilic characteristic of the polyester. The molecular weight of commercial polypropylene glycol is limited to 4,000 although it is possible, by careful manufacturing techniques, to prepare even higher molecular weights, as high as 7,500.

When commercial high molecular weight polypropylene glycol is reacted with the appropriate polybasic acid in the presence of sufficient acidic phosphorus derivatives as the reactive catalyst, the resultant polyester was found to produce an astoundingly efficient emulsion breaker. To augment the lipophilic characteristics of the polyester, the polybasic acid chosen was from the family of polymerized fatty acids; specifically the polybasic acids which are the reaction products of polyethenoid (unsaturated) fatty acids, although other polybasic acids would be suitable in the invention. Typical of this class of polybasic acids are the fatty acids referred to as dimer ($C_{36}$), trimer ($C_{54}$), or polymerized fatty acids, although any polybasic acids which possess the lipophilic characteristics such as copolymers of linoleic and/or linolenic or dimer fatty acids with maleic anhydride and/or acrylic, methacrylic acids and their esters are equally illustrative of suitable polybasic acids.

Polybasic acids Emery Empol 1024, 1040 and E1052A, and Humko Hystrene 5460 are commercial acids which are useful in the invention. It is not intended that this list represent the total embodiment of the polybasic acid component, but merely provide representative commercial examples.

| Properties of Commerical Polybasic Acids | | | | |
|---|---|---|---|---|
| | 1024 | 1040 | E1052A | 5460 |
| Acid Value | 189–197 | 183–191 | 217–226 | 182–190 |
| Saponification value | 191–199 | 192–200 | 262–298 | 190–198 |
| Color | Amber | Dark | Amber | Amber |
| Neutralization Equivalent | 287 | 288 | 260 | 287 |
| Trimer content | 25 | 80 | 25 | 60 |
| Dimer content | 75 | 20 | 25 | 40 |
| Tetramer/higher content | — | — | 50 | — |

THE RESULTS OF BOTTLE TESTS

There are four basic variables to be controlled in the formation of a polyester with which the invention is actually reduced to practice. A standard API bottle test appeared adequate to formulate these four variables.

Six bottles were filled equally with an oil field, water-in-oil emulsion. A polyester was formed of polypropylene glycol and a polybasic acid in the presence of phosphoric acid, the phosphoric acid being varied in its weight ratio to the polyester. A different weight ratio of phosphoric acid was utilized for the polyester prepared to treat each of the emulsions in the first five of the bottles. The bottles were graduated so that the water broken from the emulsion could be measured over a selected range of time periods. It was evident that the more effective weight ratio range was narrowly centered in the range of 0.35%–1.00%.

Having narrowed the range of the reactive acid catalyst required in the formation of the polyester, an API emulsion-treating bottle test was utilized to determine the more effective molecular weight of the polyol portion in the polyester. With 7,500 molecular weight of the polyol being the more practical highest value, the bottle test confirmed the desirability of the molecular weight of the polyester being at least 5,000.

The third variable of importance is viscosity. With the molecular weight of at least 5,000 and the weight ratio of the reactive acid catalyst within a narrow range including 0.35%–1.00%, the test evidenced a viscosity range as being most effective between 1,200 and 150,000 centipoise at 25° C. (10–50,000 centipoise being most practical). Generally speaking, the greater the viscosity of the polyester, the greater the molecular weight, and the greater the lipophilic characteristics of the emulsion breaker.

The following examples are provided as illustrations of specific embodiments of the invention in which the quantities are stated in parts by weight, unless otherwise indicated.

EXAMPLE I

In a three-neck reaction flask provided with means of mechanical stirring, a water trap with condenser for the removal of any aqueous phase or organic distillate formed in the course of the reaction, and a thermometer equipped with a thermoregulating device, there was added 1.96 parts of maleic anhydride, 0.5 parts 85% $H_3PO_4$, and 97.54 parts of polyol having a molecular weight of 4875 made from the oxyalkylation of dipropylene glycol with propylene oxide and ethylene oxide in a ratio of 3:1. The reaction mass was heated with stirring to 135° C. A few parts of aqueous distillate were removed. The reaction was allowed to procede until an aliquot of product exhibited an acid number of less than 10. The product was cooled and stored.

EXAMPLE II

In a manner similar to Example I, 13.98 parts of Hystrene 5460, 0.5 parts of 85% $H_3PO_4$, and 85.52 parts of a polyol having a molecular weight of 4485 made from the oxyalkylation of dipropylene glycol with propylene oxide and ethylene oxide in a ratio of 5.67:1, were heated to 204° C. until 1.1 parts of an aqueous condensate was collected. The resultant polyester was substantially free of unreacted carboxyl groups. The product was cooled.

EXAMPLE III

In a manner similar to Example I, 12.5 parts of Emery 1003B Dimer-trimer fatty acid, 1.0 parts of 85% phosphoric acid, and 86.5 parts of 3900 molecular weight polypropylene glycol were reacted until 0.4 parts of a yellow distillate was removed and the acid number indicated substantially all the free carboxyl groups had been reacted. The product was cooled.

EXAMPLE IV

In a manner similar to Example I, 16.8 parts of Emery 1040 trimer acid, 0.5 parts of phosphorous acid crystals, and 82.9 parts of 3900 molecular weight polypropylene glycol were reacted at 207° C. until substantially all the free carboxyl groups had reacted. 2.6 parts of condensate were removed from the reaction mass. The product was cooled.

EXAMPLE V

In a manner similar to Example I, 82.9 parts of 3900 molecular weight polypropylene glycol, 16.8 parts of Emery 1040 trimer acid, and 1.9 parts of polyphosphoric acid were reacted until the viscosity increased dramatically and stirring became difficult at 210° C. The product was cooled.

EXAMPLE VI

In a manner similar to Example I, 86.94 parts of a 5460 molecular weight polyol made from oxyalkylation of dipropylene glycol with propylene oxide and ethylene oxide in a ratio of 3:2, 12.66 parts of Emery 1040 trimer acid, and 0.5 of 85% phosphoric acid, were reacted at 205° C. until the viscosity increased to the point that agitation became difficult. The product was cooled.

EXAMPLE VII

In a manner similar to Example I, 92.87 parts of a 2,000 molecular weight polypropylene glycol, 6.78 parts of adipic acid, and 0.35 parts 85% phosphoric acid were reacted at 200° C. until the acid number indicated that substantially all the free acid functionally had reacted. The product was cooled.

EXAMPLE VIII

In a manner similar to Example I, 82.9 parts of a 3,900 molecular weight polypropylene glycol, 16.8 parts of Emery 1040 trimer acid, and 1 part of Monsanto DeQuest$^{TM}$ 2000, a phosphoric acid, were reacted for 11 hours until the viscosity was increased substantially. The product was cooled.

EXAMPLE IX

In a manner similar to Example I, 86.44 parts of 3,900 molecular weight polypropylene glycol, 0.5 parts of 85% phosphoric acid, and 13.06 parts of Emery experimental E-1052A Tetrabasic acid (a modified dibasic acid) were reacted until the product had increased substantially in viscosity. The product was cooled.

By way of illustrating the effectiveness of the de-emulsifiers contemplated by this invention, a standard API bottle test was performed by which the top oil dehydration and interface quality was closely scrutinized. FIGS. I through IV are illustrative of the results of the bottle tests and demonstrate the performance characteristics of this new class of de-emulsifiers. FIG. I depicts the critical amount of the non-oxidative reactive acidic phosphorus derivatives as the catalyst required for optimum performance. Polyesters derived as indicated in Example I above require a minimum reactive catalyst level of 0.35 parts/100 parts of reaction ingredients to obtain maximum dehydration. While the polyesters derived as indicated in Example II above require a minimum reactive catalyst level of 0.5 parts/100 parts of reaction ingredients. Note also that additional reactive catalyst does little to increase dehydration and, if anything, there is a gradual deterioration from the optimum dehydration. In FIG. I, only the reactive catalyst level was changed; the weight proportion of the polyol to the polybasic acid was kept constant. Based upon this data, the practical minimum amount of reactive catalyst required is within range of 0.35 to 1 part per 100 parts of reaction ingredients.

To determine whether the effect of de-emulsifying capacity was in any way related to the molecular weight of the polyol, several polyesters were evaulated by modifying the molecular weight of the polyol portion of the polyester. In this instance, the molar ratio of the polyol to polybasic acid was kept constant as was the reactive catalyst.

The results of bottle tests of polyesters, as illustrated in FIG. 2, indicate that as the molecular weight of the polyol portion of the polyester increases, the performance of the resultant polyester also increases. The polyesters were derived as indicated in Example III. These results confirm that to impart lipophilic characteristics to the polyester, a demonstrated increase in performance will follow.

The third variable of importance to control in the present invention is viscosity. To demonstrate the importance of this variable on de-emulsifying performance, a series of polyesters were made, typical of the examples provided. At a given ratio of polybasic acid to polyol, the viscosity of the final polyester exhibits a rather dramatic performance curve when viewed from the perspective of viscosity. As illustrated in FIG. 3, as the viscosity of the polyester increases, so also does the de-emulsifying performance. The degree of polymerization and cross-linking in these polyesters is difficult to ascertain; however, as the viscosity continues to increase during the course of the esterification reaction, there seems to be no diminution of de-emulsifying character. Thus, it is established that the higher the viscosity of the resultant polyester, the more efficient is its de-emulsifying capacity for a given weight ratio of polyol to polybasic acid. This phenomenon of viscosity is intrinsic to the polyester, but is dependent to a great extent of the type and quantity of catalytic reactive acidic phosphorus derivatives used in the polymerization reaction. Although it is possible to continue the polymerization scheme until gellation or decomposition occurs, it is often more practical to terminate the polymerization reaction prior to the appearance of gel particles. Although it is possible to react the reagents to achieve optimum viscosity in the resultant polyester, it is more practical to terminate the reaction prior to achieving viscosities of 150,000 cps (25° C.) which are nearly impossible to handle and transfer at ambient temperatures; the use of a suitable diluent, either in the reaction scheme, or upon termination of the reaction, renders the resultant polyester of high viscosity easier to handle. The addition of the diluent to the polyester in no way detracts from the usefulness or the applicability of the present invention to function as an effective de-emulsifier.

The final variable which requires consideration is the ratio of propylene oxide to ethylene oxide in the polyol portion of the polyester. Each crude oil has unique treating requirements. No one polyester is universally applicable or efficient in resolving all crude oil emulsions. As mentioned previously, all de-emulsifiers can be classified as LIHO (lipophilic-hydrophobic) or LIHI (lipophilic-hydrophilic). The ratio of PO/EO and method of preparation of polyol can dramatically affect the performance of the resultant polyester. As shown in FIG. 4, two different crude oils require a different ratio of ethylene oxide in the polyol portion of the polyesters derived as indicated in Example VI. Note the minima in the performance curve indicated optimum de-emulsifying capability. In reducing the present invention to practice, one would choose a PO/EO ratio in the polyol portion of the polyester of 7/1 for the West African crude oil, and 19/1 for the Mid-Continent USA crude oil. The extract ratio of PO/EO may range from 1/0 to 0/1, while more typically the ratio is from 1/0 to 1.5/1. In this more typical range, the hydrophobic to hydrophilic characteristics seem to be optimized for a given molecular weight. If more hydrophobic character in the polyester is required, then a high ratio of PO/EO is chosen, if, on the other hand, wetting and coalescing are more important, a medium ratio of PO/EO in the polyester is chosen; if surfactancy alone is required, then a low PO/EO ratio is preferred. A skilled formulator systematically arrives at the optimum oxide ratio of the de-emulsifier by balancing the LIHO and LIHI characteristics of the resultant polyester with other traditional additives at his disposal.

From the foregoing, it will be seen that this invention is one well adapted to attain all of the ends and objects hereinabove set forth, together with other advantages which are obvious and inherent to the method.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. The method of forming a polyester which is strongly lipophilic by,
combining a polyol whose lipophilic portion has a high molecular weight with a polybasic acid and with a non-oxidative reactive acidic phosphorus derivative catalyst,
and heating the solution to a high viscosity.

2. The method of claim 1, in which, the acidic phosphorus derivative is phosphoric acid.

3. The method of claim 1, in which, the acidic phosphorus derivative is phosphorous acid.

4. The method of claim 1, in which, the acidic phosphorus derivative is polyphosphoric acid.

5. The method of claim 1, in which, the acidic phosphorus derivative is phosphoric acid anhydride otherwise identified commercially as phosphorus pentoxide $P_2O_5$.

6. The method of claim 1, in which, the acidic phosphorus derivative is organo-phosphorus derivatives identified as phosphonic acids.

7. The method of claim 1, in which, the polyester is prepared from a polyol which is in turn prepared from propylene oxide and/or ethylene oxide.

8. The method of claim 7, in which, the polyol is prepared from propylene oxide and/or ethylene oxide in the weight ratio of 1/0 to 1.5/1.

9. The method of claim 7, in which, the molecular weight of the propylene oxide portion of the polyol is within the range of 2,000–7,500.

10. The method of claim 7, in which, the polyester is prepared with the rective catalyst in the weight range of 0.35–1.0 parts of reactive catalyst to 100 parts of the polybasic acid and polyol (reaction ingredients).

11. The method of claim 10, in which, the polyester has a molecular weight of at least 5,000.

12. The method of claim 11, in which, the polyester is formed with a viscosity in the range of 1,200 to 150,000 centipoise at 25° C.

* * * * *